United States Patent
Heaney et al.

(10) Patent No.: US 9,847,969 B1
(45) Date of Patent: Dec. 19, 2017

(54) APPARATUS AND METHOD FOR COLLECTING FORM DATA ACROSS OPEN AND CLOSED DOMAINS

(75) Inventors: Stephen Robert Heaney, Tarneit (AU); Tahsin Murat Boduroglu, Melbourne (AU); Brian Geoffrey Cook, Victoria (AU)

(73) Assignee: Nintex Pty Limited, Melbourne, Victoria (AU)

( * ) Notice: Subject to any disclaimer, the term of this patent is extended or adjusted under 35 U.S.C. 154(b) by 1078 days.

(21) Appl. No.: 13/403,911

(22) Filed: Feb. 23, 2012

(51) Int. Cl.
*H04L 29/06* (2006.01)
*H04L 29/08* (2006.01)
*H04L 12/26* (2006.01)
*G06F 17/24* (2006.01)

(52) U.S. Cl.
CPC ............ *H04L 63/02* (2013.01); *H04L 43/10* (2013.01); *H04L 63/168* (2013.01); *H04L 67/02* (2013.01); *H04L 67/28* (2013.01); *H04L 67/2842* (2013.01); *H04L 69/329* (2013.01); *G06F 17/243* (2013.01)

(58) Field of Classification Search
CPC .................................................. G06F 17/243
See application file for complete search history.

(56) References Cited

U.S. PATENT DOCUMENTS

| | | | |
|---|---|---|---|
| 6,651,061 B2 * | 11/2003 | Unchida | H04L 63/02 |
| 6,886,169 B2 * | 4/2005 | Wei | H04L 67/142 |
| | | | 707/E17.124 |
| 6,944,865 B1 * | 9/2005 | Zurawski | G06Q 10/10 |
| | | | 715/222 |
| 7,237,030 B2 * | 6/2007 | Chakraborty et al. | 709/229 |
| 7,257,581 B1 * | 8/2007 | Steele et al. | 709/203 |
| 7,765,310 B2 * | 7/2010 | Graveline | H04L 9/3271 |
| | | | 709/203 |
| 7,774,504 B2 * | 8/2010 | Chene et al. | 709/246 |
| 8,499,031 B1 * | 7/2013 | Kirby, Jr. | H04L 69/08 |
| | | | 709/203 |
| 8,548,902 B2 * | 10/2013 | Porter | G06Q 40/00 |
| | | | 705/35 |
| 8,584,139 B2 * | 11/2013 | Katz | H04L 67/2804 |
| | | | 719/313 |
| 8,630,990 B2 * | 1/2014 | Gowel | G06F 9/4446 |
| | | | 707/705 |
| 9,058,603 B1 * | 6/2015 | Lee | H04L 67/42 |
| 2002/0023108 A1 * | 2/2002 | Daswani et al. | 707/507 |
| 2002/0157023 A1 * | 10/2002 | Callahan | H04L 63/0227 |
| | | | 726/4 |

(Continued)

*Primary Examiner* — Patrice Winder
(74) *Attorney, Agent, or Firm* — K&L Gates LLP (57) ABSTRACT

A computer readable storage medium includes executable instructions to receive a service execution request from a closed domain. The service execution request has mark-up language expressions characterizing a form definition within a closed domain. The service execution request is hosted as a resident service responsive to service requests. A request for the resident service is received. In response to the request, the resident service is executed to form a rendered object with a format universally observed in the open domain. The rendered object corresponds to the form definition within the closed domain. The rendered object is sent across the open domain to an end user. Open domain data prompted by the rendered object is received.

11 Claims, 8 Drawing Sheets

(56) References Cited

U.S. PATENT DOCUMENTS

| | | | |
|---|---|---|---|
| 2003/0140306 A1* | 7/2003 | Robinson | G06F 21/64 715/229 |
| 2003/0187952 A1* | 10/2003 | Young et al. | 709/219 |
| 2005/0283385 A1* | 12/2005 | Hunkeler | G06Q 50/22 705/2 |
| 2008/0134089 A1* | 6/2008 | Adachi | G06F 3/0481 715/810 |
| 2008/0222617 A1* | 9/2008 | Fernando | G06Q 10/06 717/139 |
| 2008/0270535 A1* | 10/2008 | Adema | G06F 15/16 709/203 |
| 2009/0059888 A1* | 3/2009 | Nelson | G06F 11/1492 370/346 |
| 2009/0248685 A1* | 10/2009 | Pasqualoni | G06Q 30/08 |
| 2010/0094805 A1* | 4/2010 | Ingerman et al. | 707/609 |
| 2013/0246345 A1* | 9/2013 | Eisler | G06F 17/30011 707/608 |
| 2015/0020177 A1* | 1/2015 | Shmulevich | 715/239 |

* cited by examiner

APPARATUS AND METHOD FOR COLLECTING FORM DATA ACROSS OPEN AND CLOSED DOMAINS

FIELD OF THE INVENTION

This invention relates generally to data storage and retrieval in a networked environment. More particularly, this invention relates to techniques for collecting form data across open and closed domains.

BACKGROUND OF THE INVENTION

A webform (also referred to herein as a form on a web page or a form) allows a user to enter data that is sent to a server for processing. Webforms resemble paper or database forms because internet users fill out the forms using checkboxes, radio buttons or text fields. For example, webforms can be used to enter shipping or credit card data to order a product or can be used to retrieve data (e.g., searching on a search engine).

Forms are widely used to collect user input for many types of applications. Web server technologies are often used to render the forms as web pages, for consumption either on public internet accessible websites or private networks behind a corporate firewall. In the event of closed domain (e.g., a private network behind an enterprise firewall), the form may have elements that cannot traverse a firewall or otherwise be used in an open domain (e.g., the publicly accessible internet). Consequently, while closed domain forms may be accessible and otherwise useful in the closed domain, their utility cannot be exploited in the open domain.

Therefore, it would be desirable to provide a method for closed domain applications created behind a firewall to be made easily available in the open domain (e.g., outside of the firewall on the internet).

SUMMARY OF THE INVENTION

A computer readable storage medium includes executable instructions to receive a service execution request from a closed domain. The service execution request has mark-up language expressions characterizing a form definition within a closed domain. The service execution request is hosted as a resident service responsive to service requests. A request for the resident service is received. In response to the request, the resident service is executed to form a rendered object with a format universally observed in the open domain. The rendered object corresponds to the form definition within the closed domain. The rendered object is sent across the open domain to an end user. Open domain data prompted by the rendered object is received.

A computer readable storage medium includes executable instructions to receive a form definition within a closed domain. The form definition includes proprietary components that cannot pass a firewall of the closed domain. The form definition is converted to a service execution request with mark-up language expressions charactrizing the form definition. The service execution request is passed through the firewall of the closed domain to an open domain. Open domain data prompted by an object rendered by a resident service corresponding to the service execution request is polled. The open domain data is stored with an association to the form definition within the closed domain.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

An embodiment of the invention includes an internet hosted service broker and an internet hosted form rendering service, which may be offered as software-as-a-service (SAAS). Such a web service is a method of communication between two or more electronic devices over the web. A web service is a software system designed to support interoperable machine-to-machine interaction over a network. A web service has an interface described in a machine-processable format (e.g., Web Services Description Language (WSDL)). Other systems may interact with the Web service in a manner prescribed by its description using Simple Object Access Protocol (SOAP) messages, typically conveyed using Hyper-Text Transport Protocol (HTTP) with an eXtensible Markup Language (XML) serialization in conjunction with other Web-related standards. So, for example, an embodiment of the invention includes a resident service responsive to a function call (e.g., using WSDL) from a user. The resident service may invoke (e.g., using WSDL) a form rendering service. The form rendering service renders the form and supplies it to the user (e.g., using SOAP). Alternately, a functional call may be made to the rendering service, which accesses the web service broker for form definition information.

A form designer and server application in a closed domain may be preconfigured to connect to the SAAS. By utilizing this method, users may design input forms for secure applications behind a firewall and have the option to "publish" the form externally without any additional effort. The invention decouples the form structure and underlying data, which allows a form to be rendered independently of the data location.

The form elements, layout, style, and other properties are defined in a platform independent mark-up language (e.g., based on XML). This provides the ability to transport the form definition across internet protocols. Various form rendering client applications may operate in a closed domain on different hardware platforms, having the necessary means to interpret the form definition language.

The form designer allows users to design the form elements, layout, style, and other properties, and translates these properties into the form definition. A form service broker operates as a centralized message broker and service end-point registry. When a form is registered as a resident service, the message broker receives various requests from form client and form server applications. The message broker places requests in a queue, matches requests with incoming data packets and notifies the form rendering server that data is available for retrieval.

In one embodiment, a service request conveys a copy of an XML form to the form service broker, and also sends updated definitions of the uniquely identified form definition to ensure that the form definition is the same in the closed domain and in the open domain.

The form rendering service translates the form mark-up and renders it to a UI in the open domain for delivery to a client. For example, it may be translated into HTML for access through a web browser, but other form rendering client applications could be built for other hardware and platforms.

Figure 1:
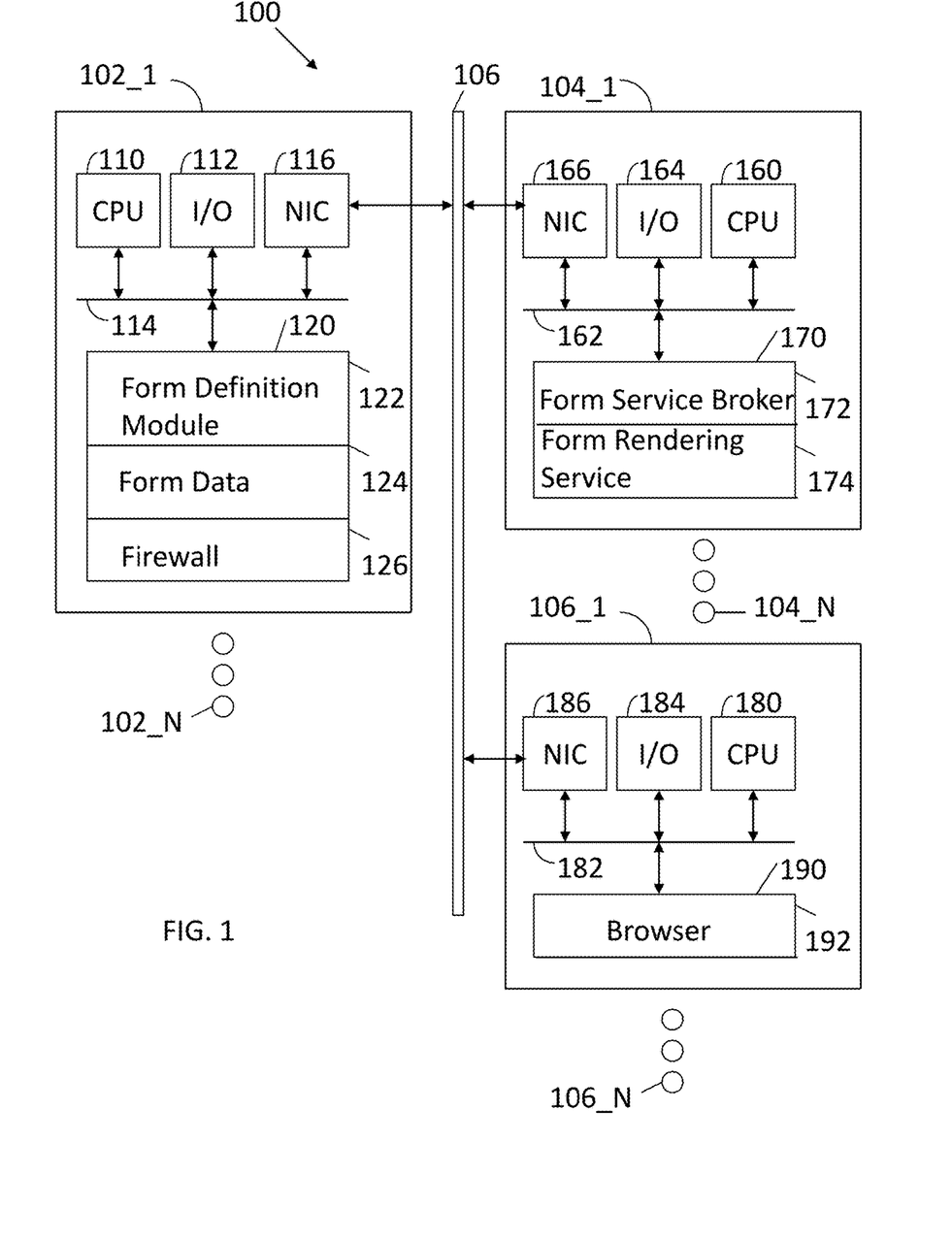
FIG. 1 illustrates a system configured in accordance with an embodiment of the invention.

FIG. 1 illustrates a system 100 configured in accordance with an embodiment of the invention. The system 100 includes one or more servers 102, which may reside behind a firewall and are therefore operable in a closed domain. Each server includes standard components, such as a central processing unit 110 and input/output devices 112 connected via a bus 114. The input/output devices 112 may include a keyboard, mouse, display, printer and the like. A network interface circuit 116 is also connected to the bus 114. The network interface circuit 116 provides an interface to network 106, which may be any wired or wireless network.

A memory 120 is also connected to the bus 114. In one embodiment, the memory 120 stores a form definition module 122, which facilitates the generation of forms in a closed domain, as discussed in more detail below. The memory 120 also stores form data 124, which may be gathered from form execution in the closed domain and form execution in the open domain. In this way, the internally generated form can collect data from a closed domain and the open domain, as discussed in more detail below. The memory 120 also stores a firewall 126. The firewall 126 prevents secure components (e.g., data, documents, form definitions) from leaving an enterprise (e.g., entering network 106 and/or server 104).

System 100 also includes one or more servers 104 operative in the open domain (e.g., the internet). Each server 104 includes standard components, such as a central processing unit 160, a bus 162, input/output devices 164 and a network interface circuit 166. A memory 170 is also connected to the bus 162. In this embodiment, the memory stores a form service broker 172 and a form rendering service 174, the operations of which are detailed below. The form service broker 172 and form rendering service 174 are shown on a single computer for convenience, but they may be executed on separate machines.

System 100 also includes client devices 106, which may reside in the closed domain (e.g., behind a firewall) and the open domain (e.g., outside the firewall on the internet). Each client device 106 includes standard components, such as a central processing unit 180, a bus 182, input/output devices 184 and a network interface circuit 186. A memory 190 is also connected to the bus 182. In one embodiment, the memory stores a browser 192. In this embodiment, form creation in the closed domain and form access in the open domain is through the web browser 192. Alternately, in the closed domain, a form application may be used to generate and publish a form, as demonstrated below.

Figure 2:
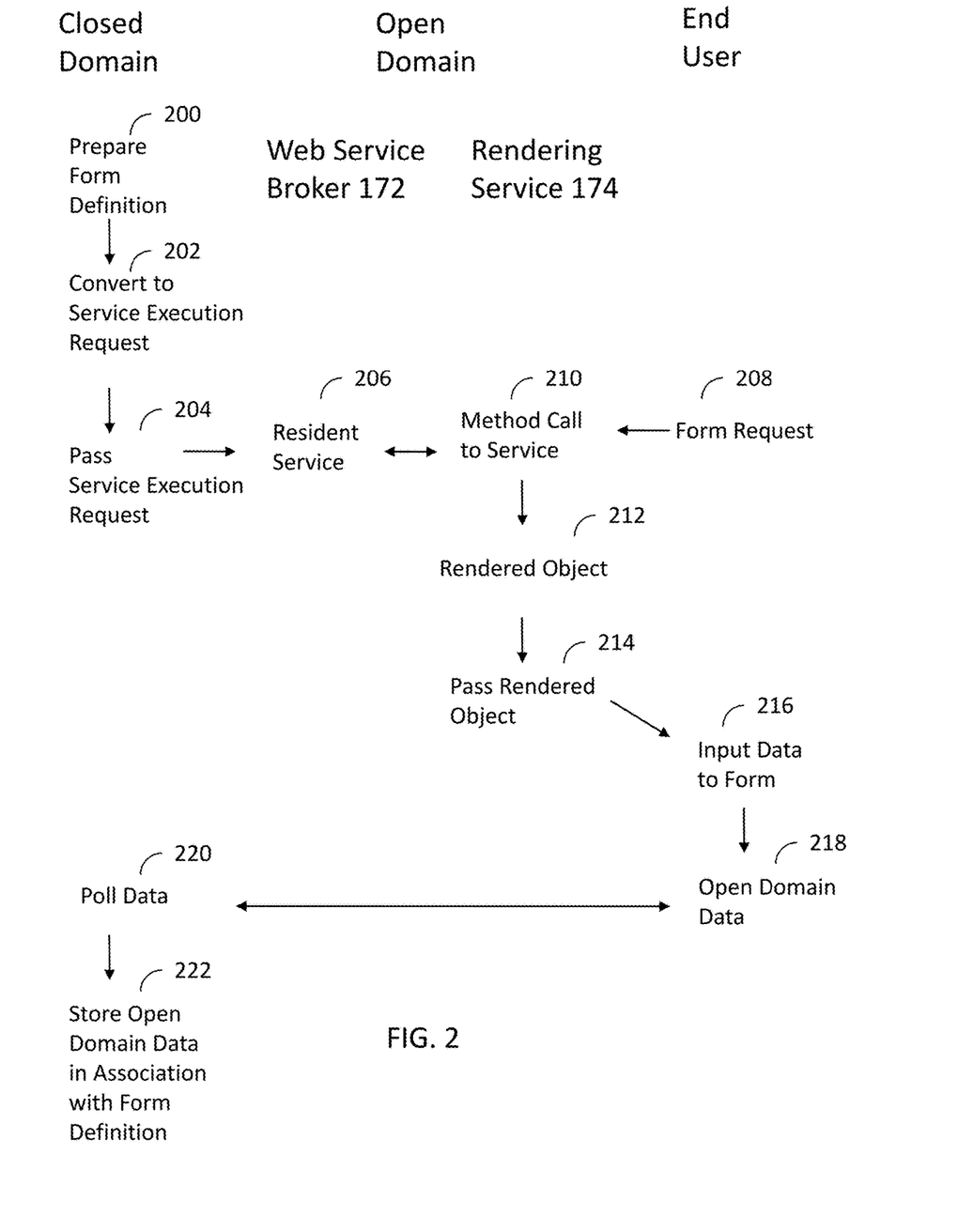
FIG. 2 illustrates processing operations associated with an embodiment of the invention.
Figure 3:
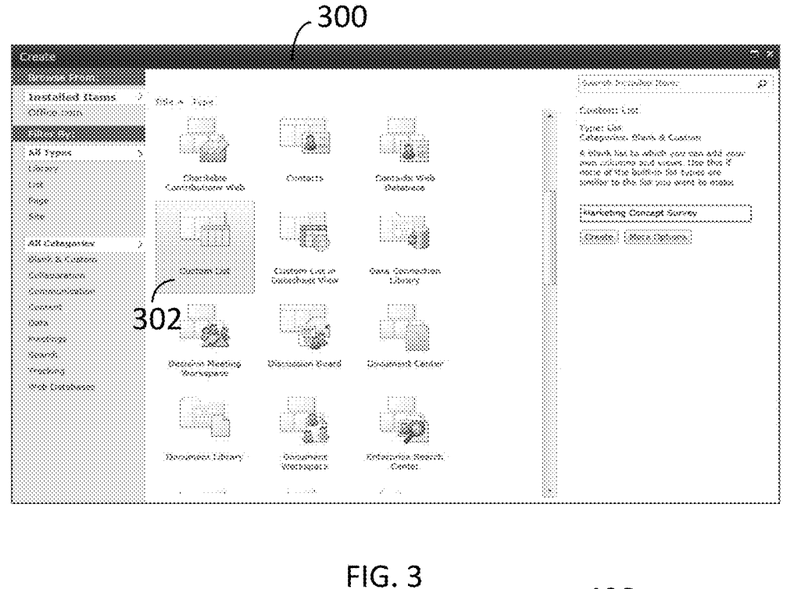
FIGS. 3-13 illustrate form construction and utilization in accordance with embodiments of the invention.

FIG. 2 illustrates processing operations associated with an embodiment of the invention. The figure illustrates a closed domain, which may be a computer 106 operating behind a firewall (e.g., a client device 106 operating behind a firewall). The figure also illustrates an open domain, which may include one or more servers hosting the form service broker 172 and form rendering service 174. The open domain may be a wide area network (e.g., the internet). An end user device, such as a client device 106 outside a firewall may also be part of the open domain.

Initially, a form definition is prepared 200 in the closed domain. The form definition is recognized by the firewall as a proprietary form and therefore cannot pass through the firewall of the closed domain. The form definition is then converted to a service execution request 202. The service execution request has mark-up language expresssions characterizing a form definition within a closed domain. The service execution request is then passed or published into the open domain 204. For example, the form service broker 172 may receive and host the service execution request as a resident service 206. The form service broker 172 is pre-configured to receive such objects from the closed domain.

Thus, a form may be created in the closed domain using proprietary technologies. Thereafter, the form is translated and stored as an openly accessible service, such as by creating a mark-up language expression of fields associated with the form. For example, an XML format may be used to characterize the form. The XML version of the form is published to the form service broker. In this way, even when proprietary techniques are used to create the form, the mark-up language version may be passed through a firewall and reside in the open domain. The mark-up language expression may also specify functions or operations associated with the form.

The form service broker 172 may provide Application Program Interface (API) endpoints that specify a set of functions available to service providers and service consumers. For example, a connector API may specify functions to establish a connection with the form service broker 172. For example, the functions may include get authentication key, request service execution, get service configuration, get service resource, collect service responses, acknowledge service response received and request data upload token. A management API may specify administrative functions, such as register service, update service, delete service, publish service configuration, update service configuration, delete service configuration, delete all service configuration and extend service configuration expiration. A service provider API may specify functions, such as collect service requests, acknowledge service requests, deliver service responses, request data upload token, get public provider identification and shorten URL.

In an embodiment, providers are applications that provide a service to be consumed through the form service broker 172. A provider, such as an enterprise application behind a firewall, may use the management API to organize available services and use the provider API to process service requests. Connectors are applications that consume the available services by accessing the form service broker 172 or the rendering service 174. For example, an end user in the open domain may use a connector application to interact with the resident service 206. The connector application may use the connector API to make service requests and collect responses to the requests.

Each resident service 206 has a set of properties that define the service. For example, the properties may include a service identification, a provider identification, a version identification, an internal name and a collection of parameters. Input parameters are parameters that are used to start the execution of a service. For example, in a weather forecast service, input parameters can be defined as the name of the city and whether to display the temperature in Celsius or Fahrenheit.

Output parameters are parameters that will be returned to the connector after the execution of a service. They are the direct outcomes of a service. For example, in a weather forecast service, the current temperature of the location is an output parameter.

Non-directional parameters are parameters that are not used for input or output. Rather, non-directional parameters characterize properties of a form. For example, a form published as a service includes a number of non-directional parameters to define the look of the form or the list of the users who can access the form.

The form definition module 122 accesses the provider and management APIs. When a user wants to publish a form, the form definition module 122 prepares the service execution request that becomes the resident service 206. In this case, the form definition is transformed into the resident service 206 published by the form definition module 122. The service execution request may include non-directional parameters. For example, XML may be used to visualize the form. The form XML may specify all the default values and visual elements of a closed domain form. Non-directional parameters may also include authentication parameters for the form. If the form is not anonymous, the parameters may include a list of authorized email addresses. An expiration date non-directional parameter may be used to automatically expire a form operative as a resident service 206. Input form parameters include data fields specified by a form. Information entered by an end user is associated with an input form parameter. In one embodiment, the input form parameters are in an XML format.

The form definition module 122 converts the form to a service execution request 202 by specifying form layout and other details using non-directional parameters. The service execution request 202 specifies that form input parameters are expected when a user submits the form (executes the service). The form definition module 122 accesses the form service broker 172 through the management API and publishes the service execution request as a resident service 206. The form service broker 172 may pass back details, such as service identification and version identification. That information is subsequently used to poll the form service broker 172 for updated data, as discussed below. The service identification and version identification may also be passed to the rendering service 174 to facilitate communications between the rendering service 174 and the web service broker 172.

An end user (e.g., a user outside the closed domain operating on the internet) requests the form 208. The request may be to the rendering service 174 or the form service broker 172. The form request 208 initiates communications between the resident service 206 of the form service broker 172 and the rendering service 174. For example, the form service broker 172 may receive a method call 210 for the resident service. The form service broker 172 passes form information to the rendering service 174. The rendering service 174 subsequently forms a rendered object 212. The rendered object 212 is then passed to the end user 214.

In one embodiment, the rendering service 174 accesses the form service broker 172 through the connector API. In this case, the rendering service 174 operates in a connector role.

At this point, the end user has a rendered form, which may be used to input data 216. The collected data constitutes open domain data (e.g., data received in the open domain from an open domain version of the form) 218. The open domain data 218 is then passed to the closed domain. For example, the form definition module 122 may periodically poll 220 the web service broker 172 for data updates. The web service broker 172 communicates with the rendering service 174 to supply requested data updates. For example, the provider API may be used to check for new form data.

The open domain data is then stored 222 in the closed domain in association with the form definition established by the form definition module 220. Thus, the closed domain can accumulate data from forms executed in the closed domain and from forms executed in the open domain.

The form definition module may use a lookup table to keep track of published services corresponding to resident forms. Open domain data may be processed in the closed domain in the same manner as data collected in the closed domain.

FIGS. 3-13 illustrate a use scenario associated with another embodiment of the invention. Suppose one wants to survey a sales team regarding a new sales initiative. GUI 300 of FIG. 3 may provide an interface to specify a list, for example by specifying a custom list 302, which allows one to enter user identifications (e.g., email addresses) for survey members.

Figure 4:
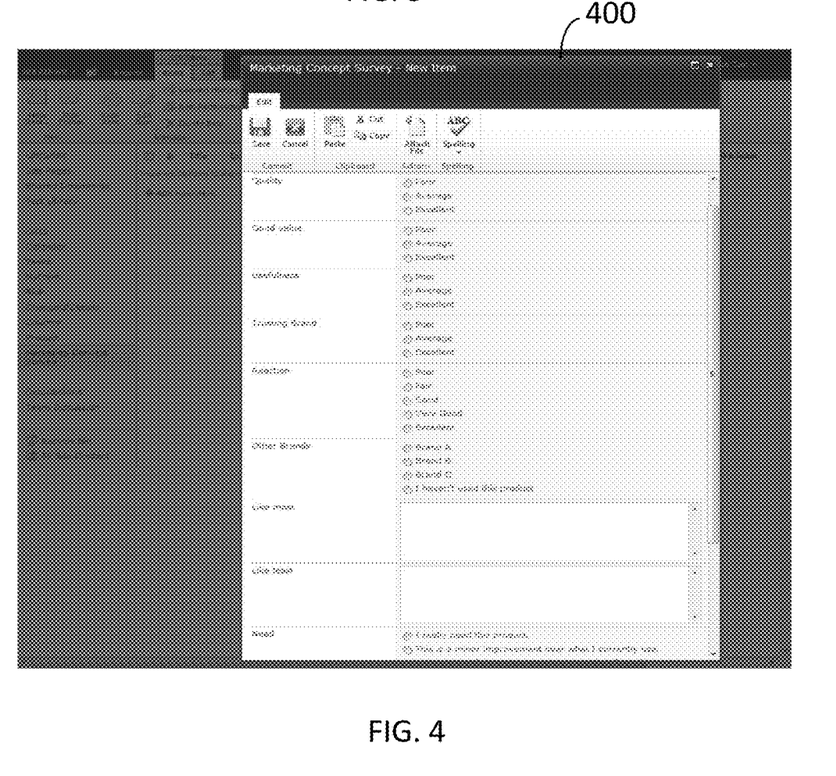
Figure 5:
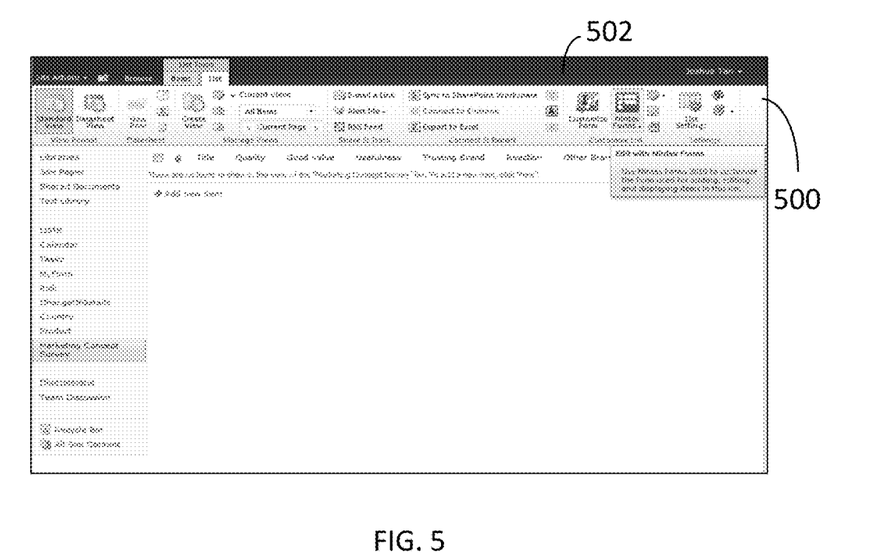
Figure 6:
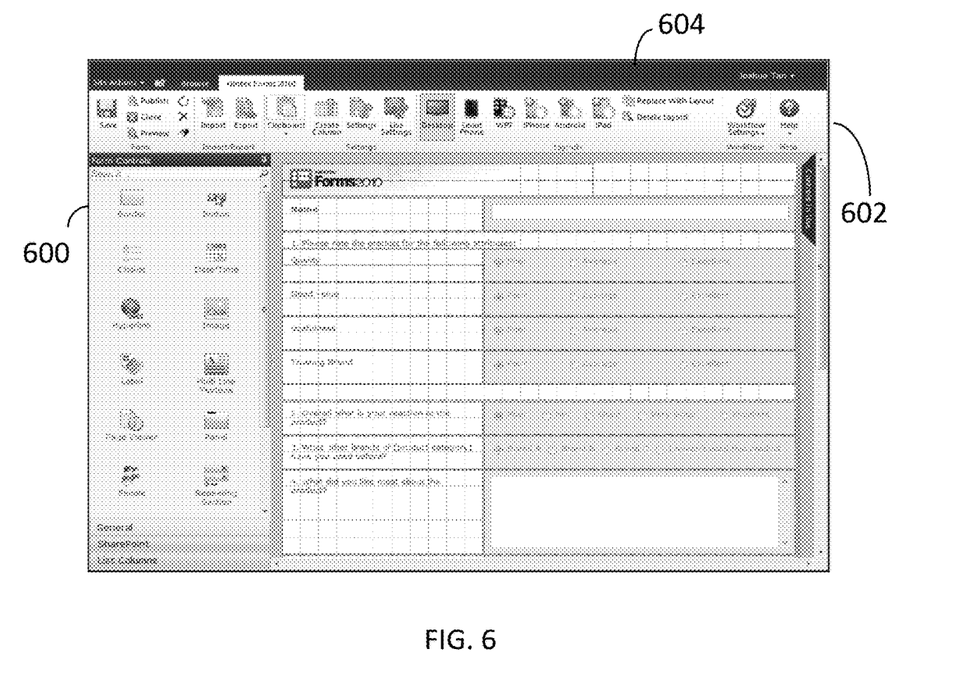
Figure 7:
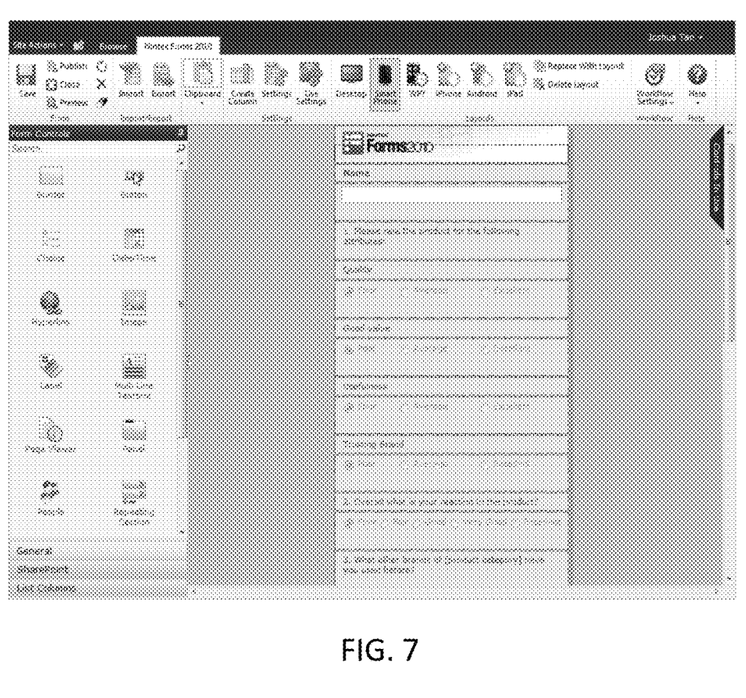

A form may then be invoked, such as form 400 of FIG. 4. A control ribbon 500 of FIG. 5 may be used to customize the form to be more visually appealing and functional. For example, icon 502 may be selected to customize the form. Selection of icon 502 may render the interface of FIG. 6, which includes form controls 600. A control ribbon 602 may optimize the form for various end user devices 604. That is, control ribbon 602 provides different layouts for different mobile devices and browser dimensions. If a smart phone device is selected through icon 604, the form is optimized for such a device, as shown in FIG. 7.

Figure 8:
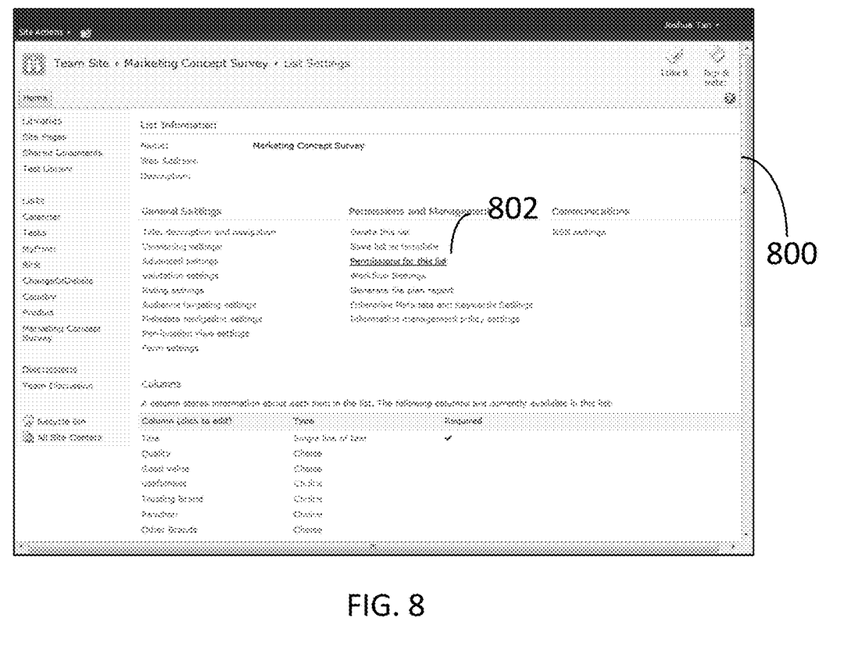
Figure 9:
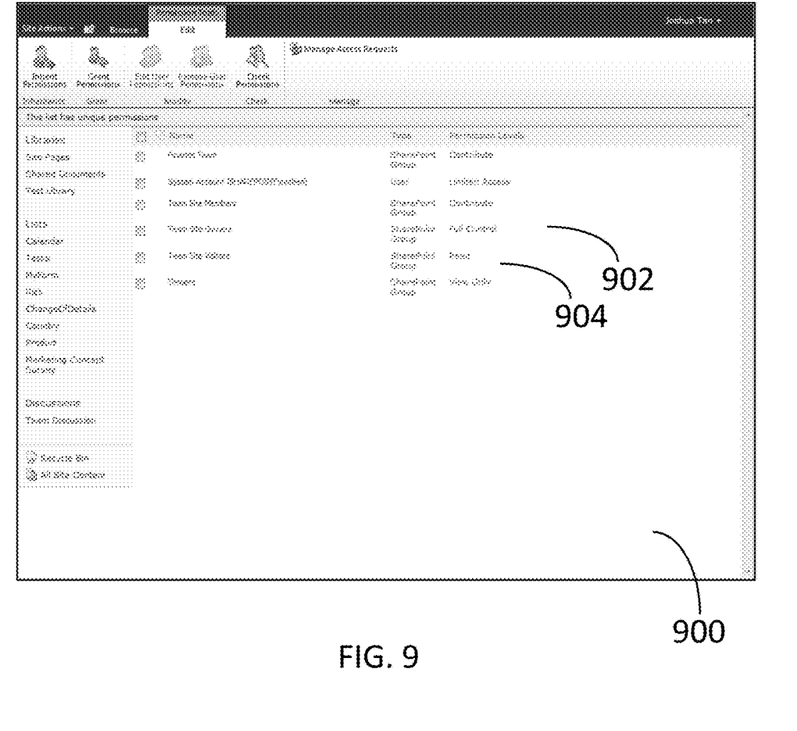

FIG. 8 shows an interface 800 to specify permissions. Selection of the permissions list 802 results in GUI 900 of FIG. 9. GUI 900 supplies different available groups within the closed domain. Because the form definition module 122 is inside a firewall, one can automatically assign access permissions to the form and allow only authorized people to access the form. The user does not need to enter identification details because the form definition module 122 has access to login details behind the firewall.

Figure 10:
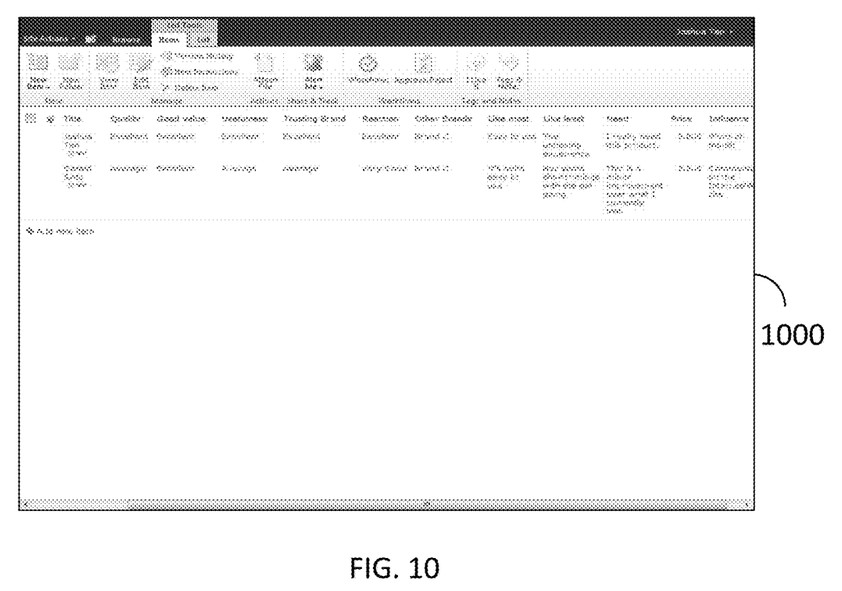
Figure 11:
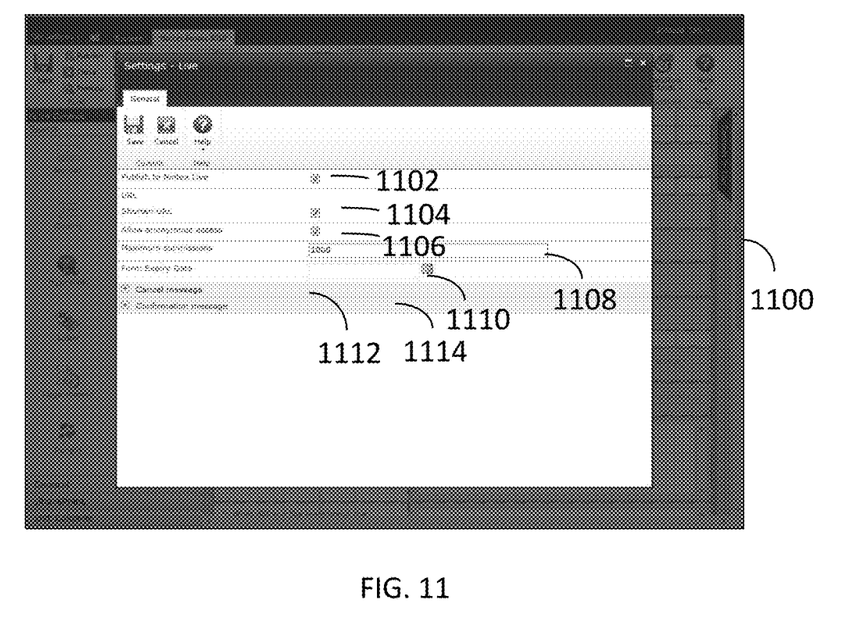

GUI 1000 of FIG. 10 illustrates collected form data. Suppose now that the sales manager wants to extend the survey to include resellers. The resellers do not have access to the enterprise system behind the firewall. A web form can be added to the public facing website or a separate web based service may be constructed. Both options incur additional cost and require the form and data storage to be developed again from scratch in another system. In addition, this results in two separate data stores—one for the internal system and one for the external system. Finally, such approaches only support simple authentication that requires the user to enter identification details.

However, in accordance with an embodiment of the invention, the form generated in the closed domain may be published into the open domain. GUI 1100 of FIG. 11 may be used to facilitate publication. GUI 1100 includes various configuration parameters for publication. A control 1102 specifies publication to the form service broker 172. An option 1104 is provided for a shortened URL to be associated with the published form. Anonymous access permission may be set with button 1106. A maximum number of submissions may be specified in block 1108. A form expiration date may be specified in block 1110. Other fields may include the configuration of a cancellation messsage 1112 or a confirmation message 1114.

Figure 12:
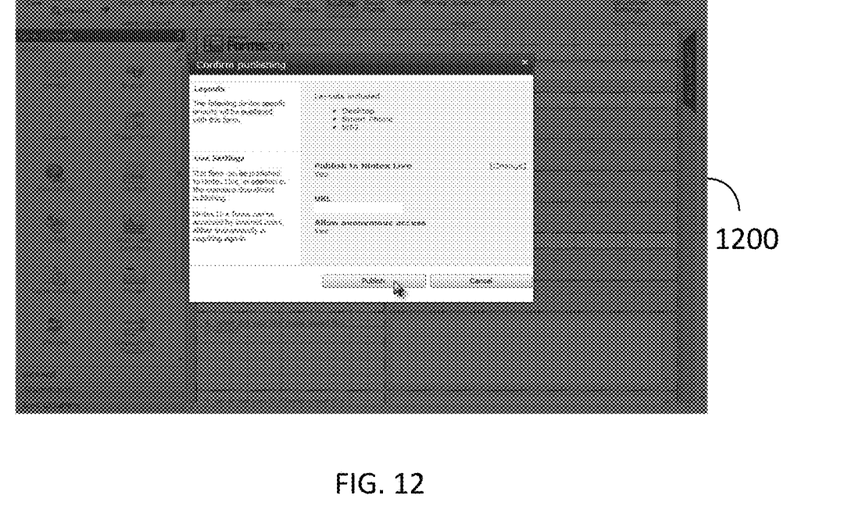

GUI 1200 of FIG. 12 provides an interface to confirm the desire to publish the internally generated form. Confirming the desire to publish results in the form definition module converting the form to a service execution request, as discussed in connection with FIG. 2. That is, the form definition module 122 is pre-configured to connect to a form service broker 172. The service execution request is sent to the form service broker 172 where it operates as a resident service 206.

Figure 13:
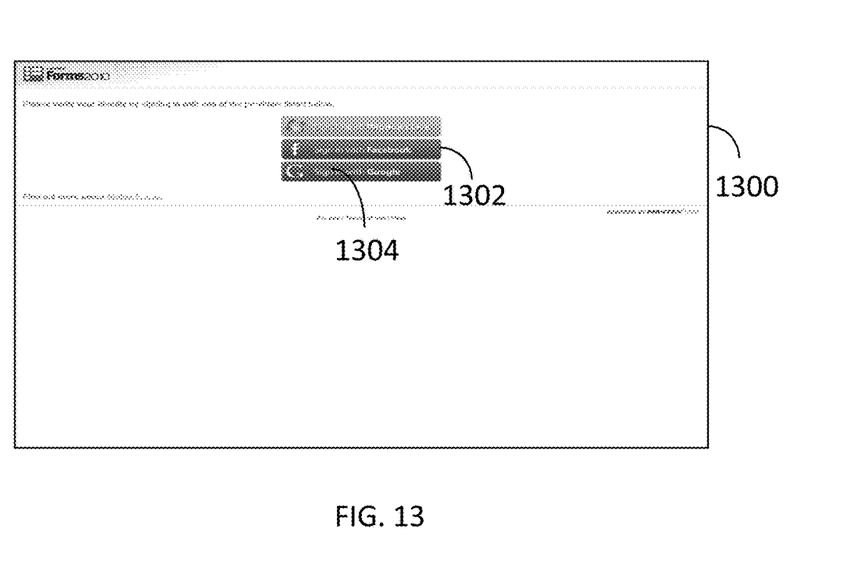

FIG. 13 illustrates an authentication GUI 1300 associated with an embodiment of the invention. An embodiment of the invention includes integration with web based authentication systems 1302, 1304. Authorized users can be specifed by their email address. When a user accesses the form service broker 172 or the rendering service 174 with an authenticated email address (e.g., from Facebook®, Google®, LinkedIn®) the user details are associated with the form submission.

An embodiment of the invention includes an authentication system. For example, the form service broker 172 may include a list of email addresses of users authorized to submit data through the form. The form rendering service 174 may include a list of third party authentication providers. A user may select an authentications service and authenticate against it. The authentication provider returns an email address and authentication token to the form rendering service, which validates the token and allows the user to enter data through the form after validation.

In the open domain, the form may be consumed by any device connected to the internet. Thus, a designed form may be accessed by a large variety of users and devices. The disclosed technology demonstrates the design of visually appealing forms with background images, custom buttons and rich formatting. Predefined device layouts or custom layouts for any screen size may be configured in accordance with embodiments of the invention. Forms may be previewed in different device layouts before publishing to the open domain.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
   a server located behind a firewall, wherein the server is specially programmed to:
   receive a form definition for a form within a closed domain behind the firewall, the form definition including proprietary components that are configured to be restricted from passing through the firewall to a web server,
   convert the form definition to an openly accessible service execution request with mark-up language expressions that characterize the form definition,
   define the form including fields to be filled in with field data based on the converted form definition,
   push the form to the web server located outside the firewall to receive the field data at the web server from a client device located outside the firewall by transmitting the form including the service execution request through the firewall of the closed domain to the web server, and
   pull the field data from the web server to a data store located behind the firewall using periodic polling via the server.

2. The system of claim 1, wherein the web server is further configured to authenticate a user of the client device as being authorized to access the form.

3. The system of claim 1, wherein the form is defined in XML.

4. A method, comprising:
   receiving, in a server, a form definition for a form within a closed domain behind a firewall, wherein the form definition includes proprietary components that are configured to be restricted from passing through the firewall to a web server;
   converting, via the server, the form definition to an openly accessible service execution request with mark-up language expressions that characterize the form definition; and
   defining the form at the server located behind the firewall based on the converted form definition, wherein the form includes fields to be filled in with field data;
   pushing the form from the server to the web server located outside the firewall to receive the field data at the web server from a client device located outside the firewall by transmitting the form including the service execution request through the firewall of the closed domain to the web server; and
   pulling the field data from the web server to a data store located behind the firewall by periodic polling the web server using the server.

5. The method of claim 4, further comprising authenticating a user of the client device at the web server as being authorized to access the form.

6. The method of claim 4, wherein the form is defined in XML.

7. The method of claim 4, wherein the mark-up language expressions are free of the proprietary components of the form definition.

8. The method of claim 4, wherein the field data includes open domain data, and further comprising
   storing the field data including the open domain data to the data store in association with the form definition including the proprietary components.

9. The method of claim 4, wherein the periodic polling of the web server includes requests for new or updated field data.

10. The method of claim 4, wherein the web server includes an application program interface ("API") endpoint that specifies how the form data is to be periodically polled.

11. The method of claim 10, wherein pulling the field data from the web server includes accessing the API endpoint using the server.

* * * * *